US009693390B2

(12) United States Patent
Beninghaus et al.

(10) Patent No.: US 9,693,390 B2
(45) Date of Patent: Jun. 27, 2017

(54) TECHNIQUES TO MANAGE A MOBILE DEVICE BASED ON NETWORK DENSITY

(75) Inventors: James Beninghaus, Campbell, CA (US); William Ngo, Fremont, CA (US); Welly Kasten, Sunnyvale, CA (US); Neil Hendin, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1017 days.

(21) Appl. No.: 12/642,516

(22) Filed: Dec. 18, 2009

(65) Prior Publication Data

US 2011/0153805 A1 Jun. 23, 2011
US 2016/0323934 A9 Nov. 3, 2016

Related U.S. Application Data

(63) Continuation-in-part of application No. 12/475,961, filed on Jun. 1, 2009, now Pat. No. 8,185,165, and a
(Continued)

(51) Int. Cl.
*G06F 15/173* (2006.01)
*H05B 1/02* (2006.01)
(Continued)

(52) U.S. Cl.
CPC ......... *H05B 1/0202* (2013.01); *H04B 17/309* (2015.01); *H04B 17/382* (2015.01); *H04W 52/346* (2013.01)

(58) Field of Classification Search
CPC ... H04B 17/382; H04B 17/309; H04W 16/18; H04W 52/346
(Continued)

(56) References Cited

U.S. PATENT DOCUMENTS 5,361,401 A 11/1994 Pirillo
5,491,472 A 2/1996 Kurtz
(Continued)

FOREIGN PATENT DOCUMENTS

CN 1270462 A 10/2000
CN 1301120 A 6/2001
(Continued)

OTHER PUBLICATIONS

International Search Report and Written Opinion of the International Searching Authority, mailed Jun. 28, 2012, issued in related PCT Appliclation PCT PCT/US2010/060983.
(Continued)

*Primary Examiner* — Krista Zele
*Assistant Examiner* — Michael A Chambers
(74) *Attorney, Agent, or Firm* — Norton Rose Fulbright LLP

(57) ABSTRACT

Techniques to manage a mobile device based on network density are described. An apparatus may comprise a mobile computing device having a radio module operative to receive radio signals, a resource detector operative to collect a sample for one or more wireless resources based on the received radio signals, a network density module operative to estimate a network density for an operating environment of the mobile computing device based on the sample and a probability density function, and a parameter management module operative to manage one or more operational parameters of the mobile computing device based on the estimated network density. Other embodiments are described and claimed.

20 Claims, 7 Drawing Sheets

Related U.S. Application Data continuation-in-part of application No. 12/479,568, filed on Jun. 5, 2009, now Pat. No. 8,265,563.

(51) Int. Cl.
   *H04B 17/309* (2015.01)
   *H04B 17/382* (2015.01)
   *H04W 52/34* (2009.01)

(58) Field of Classification Search
   USPC ....... 340/539.12; 709/224; 375/297; 706/45; 370/254
   See application file for complete search history.

(56) References Cited

U.S. PATENT DOCUMENTS

| | | | |
|---|---|---|---|
| 5,499,243 A | 3/1996 | Hall | |
| 5,515,369 A | 5/1996 | Flammer, III et al. | |
| 5,574,978 A | 11/1996 | Talwar et al. | |
| 5,630,223 A | 5/1997 | Bahu et al. | |
| 5,826,181 A | 10/1998 | Reed | |
| 6,018,644 A | 1/2000 | Minarik | |
| 6,032,026 A | 2/2000 | Seki et al. | |
| 6,081,720 A | 6/2000 | Sampson | |
| 6,128,479 A | 10/2000 | Fitzpatrick et al. | |
| 6,272,322 B1* | 8/2001 | Su | H04B 17/309 455/67.14 |
| 6,317,436 B1* | 11/2001 | Young | H04B 7/2656 370/443 |
| 6,326,926 B1 | 12/2001 | Shoobridge et al. | |
| 6,392,487 B1 | 5/2002 | Alexanian | |
| 6,539,204 B1 | 3/2003 | Marsh et al. | |
| 6,560,443 B1 | 5/2003 | Vaisanen et al. | |
| 6,574,206 B2* | 6/2003 | Young | H04B 7/2656 370/337 |
| 6,584,090 B1 | 6/2003 | Abdelgany et al. | |
| 6,643,522 B1 | 11/2003 | Young | |
| 6,646,505 B2 | 11/2003 | Anderson et al. | |
| 6,704,346 B1 | 3/2004 | Mansfield | |
| 6,771,966 B1* | 8/2004 | Chow | H04W 16/18 455/446 |
| 6,842,607 B2 | 1/2005 | Godfrey et al. | |
| 7,046,649 B2 | 5/2006 | Awater et al. | |
| 7,142,884 B2 | 11/2006 | Hagn | |
| 7,167,722 B2 | 1/2007 | Chiu et al. | |
| 7,177,645 B2 | 2/2007 | Goldhamer et al. | |
| 7,180,884 B2* | 2/2007 | Elliott | H04W 8/005 370/338 |
| 7,233,602 B2 | 6/2007 | Chen et al. | |
| 7,242,294 B2* | 7/2007 | Warrior | H04B 7/18506 340/539.11 |
| 7,248,657 B2 | 7/2007 | Aromaa et al. | |
| 7,251,459 B2 | 7/2007 | McFarland et al. | |
| 7,324,793 B2 | 1/2008 | Lee et al. | |
| 7,369,092 B1 | 5/2008 | Wen et al. | |
| 7,406,296 B2 | 7/2008 | Haartsen | |
| 7,447,519 B2 | 11/2008 | Axness et al. | |
| 7,468,963 B2 | 12/2008 | Capretta | |
| 7,489,903 B2 | 2/2009 | Johansson et al. | |
| 7,577,091 B2* | 8/2009 | Antal | H04L 41/0806 370/229 |
| 7,580,386 B2 | 8/2009 | Oliver et al. | |
| 7,636,336 B2 | 12/2009 | Forte et al. | |
| 7,664,455 B2 | 2/2010 | So et al. | |
| 7,710,927 B2 | 5/2010 | Ozluturk | |
| 7,720,779 B1* | 5/2010 | Perry | G06N 5/04 706/45 |
| 7,778,226 B2 | 8/2010 | Rayzman et al. | |
| 7,873,385 B2 | 1/2011 | Boireau et al. | |
| 7,920,883 B2 | 4/2011 | Tu | |
| 7,971,253 B1* | 6/2011 | Gupta | H04L 63/1416 726/11 |
| 8,036,683 B2 | 10/2011 | Tu et al. | |
| 8,064,537 B2* | 11/2011 | Xu | H04W 52/346 375/297 |
| 8,185,165 B2 | 5/2012 | Beninghaus et al. | |
| 8,249,527 B2 | 8/2012 | Rybicki | |
| 8,260,214 B2 | 9/2012 | Marlett et al. | |
| 8,265,563 B2 | 9/2012 | Beninghaus et al. | |
| 8,284,721 B2 | 10/2012 | Chen et al. | |
| 8,498,574 B2 | 7/2013 | Beninghaus et al. | |
| 8,583,057 B2 | 11/2013 | Tu et al. | |
| 8,755,747 B2 | 6/2014 | Robinson et al. | |
| 8,909,165 B2 | 12/2014 | Hendin | |
| 2001/0005685 A1 | 6/2001 | Nishimori et al. | |
| 2002/0068588 A1 | 6/2002 | Yoshida et al. | |
| 2002/0077154 A1 | 6/2002 | Judson et al. | |
| 2002/0086644 A1 | 7/2002 | Koskinen | |
| 2002/0136184 A1 | 9/2002 | Liang et al. | |
| 2002/0142725 A1 | 10/2002 | Clelland et al. | |
| 2003/0014682 A1 | 1/2003 | Schmidt | |
| 2003/0055735 A1* | 3/2003 | Cameron | G06Q 20/04 705/27.1 |
| 2003/0128690 A1* | 7/2003 | Elliott | H04W 8/005 370/351 |
| 2003/0189935 A1* | 10/2003 | Warden | H04L 12/5693 370/395.21 |
| 2004/0028003 A1 | 2/2004 | Diener et al. | |
| 2004/0141522 A1 | 7/2004 | Texerman et al. | |
| 2004/0185856 A1* | 9/2004 | McKenna | H04W 4/08 455/445 |
| 2004/0218563 A1* | 11/2004 | Porter | H04W 16/04 370/329 |
| 2005/0003855 A1 | 1/2005 | Wada et al. | |
| 2005/0025164 A1 | 2/2005 | Kavanagh et al. | |
| 2005/0030924 A1 | 2/2005 | Yano et al. | |
| 2005/0149628 A1* | 7/2005 | Mazzola | H04L 12/2803 709/224 |
| 2005/0170776 A1 | 8/2005 | Siorpaes | |
| 2005/0226616 A1 | 10/2005 | Davidson | |
| 2005/0227631 A1 | 10/2005 | Robinett et al. | |
| 2006/0099981 A1* | 5/2006 | McKenna | H04W 4/08 455/508 |
| 2006/0104232 A1 | 5/2006 | Gidwani | |
| 2006/0111042 A1 | 5/2006 | Pitchers | |
| 2006/0121916 A1 | 6/2006 | Aborn et al. | |
| 2006/0153284 A1 | 7/2006 | Souissi et al. | |
| 2006/0194538 A1 | 8/2006 | Palin et al. | |
| 2006/0268785 A1 | 11/2006 | Park et al. | |
| 2006/0292986 A1 | 12/2006 | Bitran et al. | |
| 2007/0060055 A1 | 3/2007 | Desai et al. | |
| 2007/0115905 A1 | 5/2007 | Jokela et al. | |
| 2007/0129104 A1 | 6/2007 | Sano et al. | |
| 2007/0149123 A1 | 6/2007 | Palin | |
| 2007/0281760 A1 | 12/2007 | Nikitin et al. | |
| 2007/0293224 A1 | 12/2007 | Wang et al. | |
| 2008/0107071 A1 | 5/2008 | Tsigler et al. | |
| 2008/0139125 A1 | 6/2008 | Son et al. | |
| 2008/0144493 A1* | 6/2008 | Yeh | H04W 74/0816 370/230 |
| 2008/0219377 A1 | 9/2008 | Nisbet | |
| 2008/0253345 A1 | 10/2008 | Sanguinetti | |
| 2008/0253386 A1* | 10/2008 | Barum | H04L 45/00 370/406 |
| 2008/0260000 A1 | 10/2008 | Periyalwar et al. | |
| 2008/0310350 A1* | 12/2008 | Dykema | H04L 45/32 370/328 |
| 2009/0003252 A1 | 1/2009 | Salomone et al. | |
| 2009/0022078 A1 | 1/2009 | Patterson et al. | |
| 2009/0059827 A1* | 3/2009 | Liu | H04W 76/048 370/311 |
| 2009/0088089 A1 | 4/2009 | Chandra et al. | |
| 2009/0170447 A1 | 7/2009 | Marlett et al. | |
| 2009/0181466 A1 | 7/2009 | Wenzel et al. | |
| 2009/0243873 A1 | 10/2009 | Mizukawa et al. | |
| 2009/0274158 A1* | 11/2009 | Sharp | H04L 67/104 370/400 |
| 2010/0150027 A1* | 6/2010 | Atwal | H04W 16/18 370/254 |

(56) References Cited

U.S. PATENT DOCUMENTS

| | | | | |
|---|---|---|---|---|
| 2010/0277308 | A1* | 11/2010 | Potkonjak | H04W 28/18 340/539.12 |
| 2011/0085494 | A1* | 4/2011 | Ji | H04W 40/12 370/328 |
| 2011/0099126 | A1* | 4/2011 | Belani | G06Q 30/0284 705/418 |

FOREIGN PATENT DOCUMENTS

| | | |
|---|---|---|
| CN | 1930793 A | 3/2007 |
| CN | 1946199 A | 4/2007 |
| CN | 101044778 A | 9/2007 |
| CN | 101464722 A | 6/2009 |
| EP | 1225785 A1 | 7/2002 |
| EP | 1914835 A | 4/2008 |
| KR | 20030058897 A | 7/2003 |
| KR | 20080046423 A | 5/2008 |
| WO | WO-2005086379 A1 | 9/2005 |
| WO | WO-2005107064 A1 | 11/2005 |
| WO | WO-2005125024 A2 | 12/2005 |
| WO | WO-2006059294 A1 | 6/2006 |
| WO | WO-2006090242 A1 | 8/2006 |
| WO | WO-2007118126 A2 | 10/2007 |
| WO | WO-2007149957 A1 | 12/2007 |
| WO | WO-2008055227 A2 | 5/2008 |
| WO | WO-2008102885 A1 | 8/2008 |
| WO | WO-2009022709 A1 | 2/2009 |
| WO | WO-2010104767 A2 | 9/2010 |
| WO | WO-2010141383 A2 | 12/2010 |
| WO | WO-2011075632 A2 | 6/2011 |

OTHER PUBLICATIONS 802.15.2 (TM), "Part 15.2: Coexistence of Wireless Personal Area Networks with Other Wireless Devices Operating in Unlicensed Frequency Bands", IEEE Computer Society, New York, NY, Aug. 28, 2003.

Supplementary European Search Report—EP10838285—Search Authority—Munich—Jun. 22, 2015.

* cited by examiner

TECHNIQUES TO MANAGE A MOBILE DEVICE BASED ON NETWORK DENSITY

RELATED APPLICATIONS

This application is a continuation-in-part, and claims priority to, the commonly-owned co-pending patent applications U.S. Ser. No. 12/475,961, entitled "METHOD AND APPARATUS FOR ADAPTIVE POWER SAVING IN A MOBILE COMPUTING DEVICE," filed Jun. 1, 2009, and U.S. Ser. No. 12/479,568, entitled "TECHNIQUES FOR ENHANCED CO-EXISTENCE OF CO-LOCATED RADIOS," filed Jun. 5, 2009, which are all incorporated herein by reference in their entirety.

BACKGROUND

Mobile computing devices, such as smart phones, are by definition mobile and therefore designed to move between various operating environments. Different operating environments may dramatically affect operations for a mobile computing device. However, various operating parameters designed to control operations for a mobile computing device are typically static and therefore do not account for variations in operating environments. Those operating parameters which may be dynamic are typically varied based on a given set of assumptions that may not necessarily match a given operating environment. For instance, a retry count for network or channel access may simply decay according to some random or linear progression. As a result, a mobile computing device may suffer from reduced performance, such as providing reduced functionality, impaired services, or increased power consumption. It is with respect to these and other reasons that techniques to improve management of operating parameters for a mobile computing device are needed.

DETAILED DESCRIPTION

Figure 1:
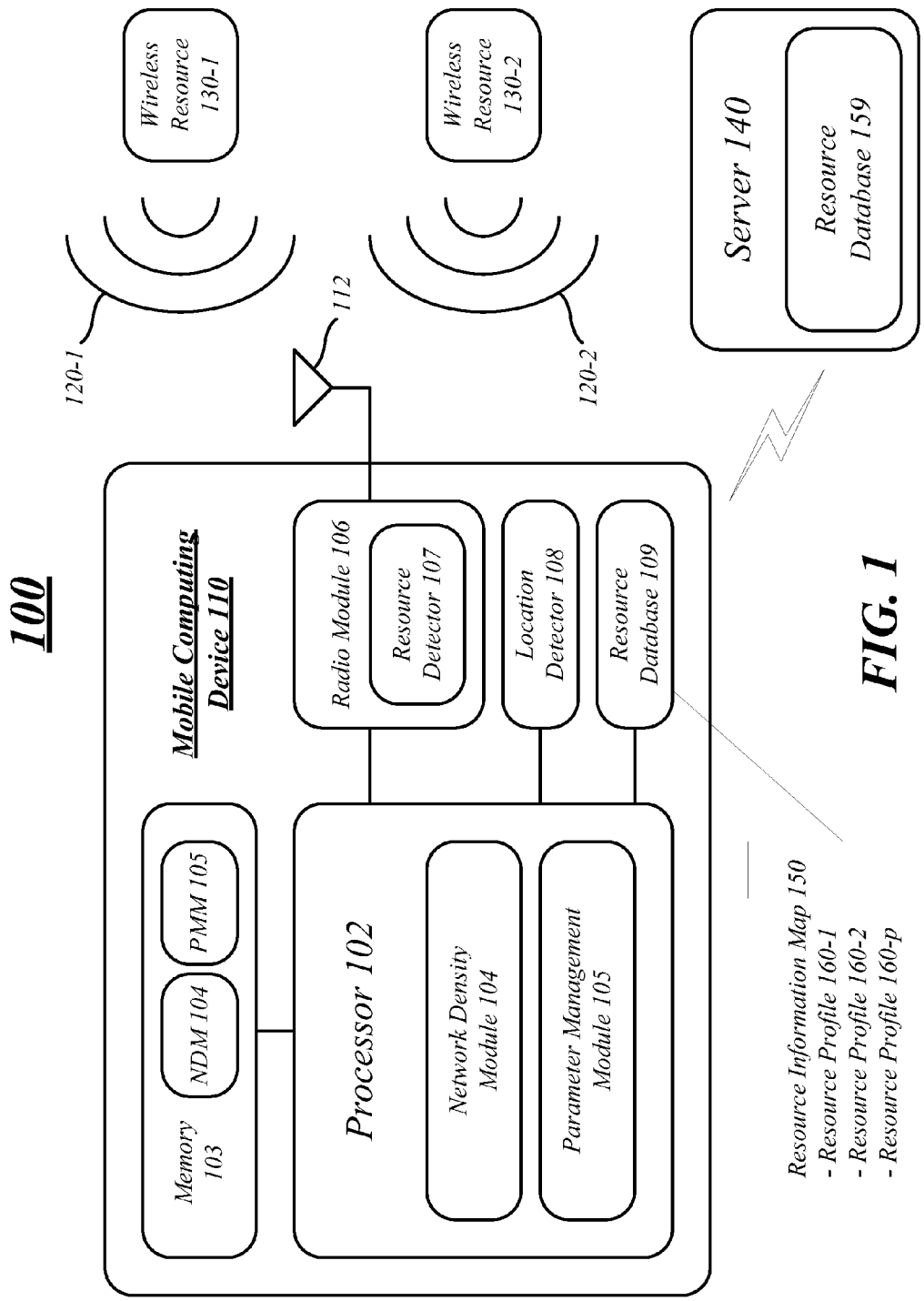
FIG. 1 illustrates one embodiment of a first mobile computing device.

Various embodiments are generally directed to techniques to manage a mobile computing device based on network density. Some embodiments are particularly directed to techniques to manage or adaptively control one or more operational parameters for a mobile computing device based on an estimated network density for an operational environment of the mobile computing device. This may enhance behavior and performance for various hardware and/or software components of the mobile computing device.

Network density generally refers to a number of wireless resources clustered, grouped, co-located or otherwise organized within a defined geographical region. Examples of wireless resources may include various fixed wireless devices, such as wireless access points for a wireless local area network (WLAN), a base station or cellular access point for a wireless wide area network (WWAN), and a mobile wireless device attempting to join a wireless personal area network (WPAN), among other devices. Network density attempts to quantify, predict or estimate how many available wireless resources are within a defined geographic region, such as within a given geographic area, a building, a park, a public "hotspot," a campus, a town, a city, a state, a communication range, and so forth. A mobile computing device, such as a smart phone, may utilize estimated network density to improve performance of one or more operational characteristics of the mobile computing device. For instance, a mobile computing device may decrease scanning operations in a lower network density environment to conserve power, or modify a received signal strength indication (RSSI) trigger threshold for communicating information or performing hand-over operations, among other use scenarios.

In one embodiment, for example, a mobile computing device may comprise a radio module operative to receive radio signals from one or more wireless resources, such as a wireless access point or base station. A resource detector may be operative to collect a sample for the one or more wireless resources based on the received radio signals. The sample may be some measurable characteristic of the one or more wireless resources, such as a RSSI value or signal-to-noise ratio (SNR) value, among others. A network density module may be operative to estimate a network density for an operating environment of the mobile computing device based on the collected samples and a probability density function. The probability density function may be derived, for example, using measured data from geographic locations with known levels of network density (e.g., a building). The measured data may be used to construct models for different concentrations of network density, such as low density, middle density, high density, and so forth. The definition of high, middle, low density networks may vary depending on the network type due to the range and transmit power of various network types. For example, two (2) cellular base stations in a given small area might constitute a high density network, but the same area might need many WLAN access points to be categorized as a high density network, due to the differing characteristics of WLAN and cellular networks.

A parameter management module may be operative to manage one or more operational parameters of the mobile computing device based on the estimated network density. Examples of operational parameters may include without limitation a network scanning threshold parameter, a radio-frequency channel parameter, an access point parameter, a rate selection parameter, a frame size parameter, an aggregation size parameter, a packet retry limit parameter, a power level parameter, a component parameter, a protocol parameter, a radio parameter, an application parameter, an alarm parameter, and other parameters affecting operations for a mobile computing device. In this manner, various hardware and/or software components for a mobile computing device may be tuned for operation in a given operating environment to enhance performance of the mobile computing device. Other embodiments are described and claimed.

Adaptively controlling one or more operational parameters for a mobile computing device based on predicted network density may have several advantages. For instance, selecting a packet retry limit parameter suited to a given network density may reduce an amount of power consumed by a mobile computing device. Having a higher packet retry limit in a lower network density environment, for example, could waste valuable communications resources and system power. Modifying a packet retry limit to be efficient at a given level of network density may result in improved system performance and extended battery life. In another example, selecting RSSI trigger points used to determine when to communicate information over a channel may also increase system performance and decrease power consumption. For example, RSSI thresholds are used to determine when an amount of radio energy in a wireless channel is below a certain level at which point it is clear to send information over a wireless local area network (WLAN), or to handover to a different access point. In the former case, when a mobile computing device is in an operating environment with a lower network density, the parameter management module may select a slightly higher RSSI threshold since there is less likelihood that interfering radio energy will be transmitted on the same channel (e.g., by a nearby access point). A higher network density may imply a lower RSSI threshold for similar reasons. These are merely a couple of examples, and many more use scenarios may fall within the scope of the embodiments. By intelligently estimating network density for a given operating environment of a mobile computing device, operational parameters for the mobile computing device may be adaptively controlled based on the estimated network density to improve device performance, power management, functionality, and user convenience.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements, nodes or modules in a certain topology by way of example, the embodiment may include other combinations of elements, nodes or modules in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment. It should also be understood that the use of the term control to refer to data and/or signals throughout the application can refer to data flowing in any direction as control and/or status data or signals.

FIG. 1 illustrates one embodiment of an apparatus that may communicate across different types of wireless links. In particular, FIG. 1 shows a communications system 100 comprising various representative elements, including a mobile computing device 110 capable of communicating via radio signals 120-1-$m$ with one or more wireless resources 130-1-$n$. The mobile computing device 110 may include by way of example and not limitation a processor 102, a memory 103, a network density module 104, a parameter management module 105, a radio module 106, a location detector 108, a resource database 109, and an antenna 112. The radio module 106 may further include a resource detector 107. These elements or portions of these elements may be implemented in hardware, software, firmware, or in any combination thereof. The embodiments are not limited to these depicted elements.

In some embodiments, one or more interfaces may employ various techniques to exchange information between the elements of the mobile computing device 110. For example, an interface may activate and/or detect activated signal lines. Such signal lines may be dedicated to particular signals. Alternatively, an interface may generate data messages to be transmitted across various connections. Exemplary connections may include a parallel interface, a serial interface, a bus interface, and/or a data network.

In various embodiments, the mobile computing device 110 may be generally configured to support or provide cellular voice communication, wireless data communication and computing capabilities. The mobile computing device 110 may be implemented as a combination handheld computer and mobile telephone, sometimes referred to as a smart phone. Examples of smart phones include, for example, Palm® products such as the Palm Pre™, Palm Pixi™ and Palm Treo™ line of smart phones. Although some embodiments may be described with the mobile computing device 110 implemented as a smart phone by way of example, it may be appreciated that the embodiments are not limited in this context. For example, the mobile computing device 110 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth. Additional details for a mobile computing device may be described in more detail with reference to FIG. 5.

The processor 102 may comprise a general purpose processor, a communications processor or an application specific processor arranged to provide general or specific computing capabilities for the communications system 100. For example, the processor 102 may perform operations associated with higher layer protocols and applications. For instance, the processor 102 may be implemented as a host processor to provide various user applications, such as telephony, text messaging, e-mail, web browsing, word processing, video signal display, and so forth. In addition, the processor 102 may provide one or more functional utilities that are available to various protocols, operations, and/or applications. Examples of such utilities include operating systems, device drivers, user interface functionality, and so forth.

The memory 103 may comprise computer-readable media such as volatile or non-volatile memory units arranged to store programs and data for execution by the processor 102. As depicted in FIG. 1, the memory 103 may store a network density module 104 and a parameter management module 105 in the form of executable program instructions, code or data. The processor 102 may retrieve and execute the program instructions, code or data from the memory 103 to adaptively control one or more operational parameters for the mobile computing device 110. Although the network density module 104 and the parameter management module 105 are shown as part of the memory 103 for execution by the processor 102, it may be appreciated that the network density module 104 and/or the parameter management module 105 may be stored and executed by other memory and processing resources available to the mobile computing device 110, such as a radio or communications processor and accompanying memory implemented by the radio module 106. Further, although the network density module 104 and the parameter management module 105 are depicted as software executed by a processor, it may be appreciated that the operations for the modules 104, 105 may be implemented in hardware as well using one or more integrated circuits, for example. The embodiments are not limited in this context.

The radio module 106 may comprise one or more radios or wireless transceivers, each having various radio elements, including a radio processor, one or more transceivers, amplifiers, filters, switches, and so forth. The radio module 106 may communicate with remote devices across different types of wireless links utilizing various wireless wide area network (WWAN) communications techniques. For example, the radio module 106 may communicate across wireless links provided by one or more cellular radiotelephone systems. Examples of cellular radiotelephone systems may include Code Division Multiple Access (CDMA) systems, GSM systems, North American Digital Cellular (NADC) systems, Time Division Multiple Access (TDMA) systems, Extended-TDMA (E-TDMA) systems, Narrowband Advanced Mobile Phone Service (NAMPS) systems, third generation (3G) systems such as Wide-band CDMA (WCDMA), CDMA-2000, Universal Mobile Telephone System (UMTS) systems, and so forth. The radio module 106 (or additional radio modules) may also communicate across data networking links provided by one or more cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and so forth. The embodiments, however, are not limited to these examples.

In some cases, the radio module 106 may additionally or alternatively communicate across various non-cellular communications links, such as a wireless local area network (WLAN). The radio module 106 may be arranged to provide voice and/or data communications functionality in accordance with different types of wireless network systems or protocols. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

The mobile computing device 110 may also utilize different types of shorter range wireless systems, or wireless personal area networks (WPAN) such as a Bluetooth system operating in accordance with the Bluetooth Special Interest Group (SIG) series of protocols, including Bluetooth Specification versions v1.0, v1.1, v1.2, v1.0, v2.0 with Enhanced Data Rate (EDR), as well as one or more Bluetooth Profiles, and so forth. Other examples may include systems using infrared techniques or near-field communication techniques and protocols, such as electro-magnetic induction (EMI) techniques. An example of EMI techniques may include passive or active radio-frequency identification (RFID) protocols and devices.

It may be appreciated that the radio module 106 may utilize different communications elements (e.g., radio processors, transceivers, etc.) to implement different communications techniques. Furthermore, the radio module 106 may support multiple communications techniques by implementing multiple sets of corresponding radio equipment. For example, the radio module 106 may support GSM communications using a first transceiver, IEEE 802.xx (e.g., 802.11) communications using a second transceiver, Bluetooth communications using a third transceiver, and so forth. The embodiments are not limited in this context.

The radio module 106 may have a resource detector 107 arranged to periodically or continuously scan wireless shared media, such as one or more portions of the radio-frequency (RF) spectrum, for the various radios implemented by the radio module 106. The radio module 106 may implement a scanning algorithm to perform various scanning operations for radio energy. Radio energy may refer to RF energy used by a radio or wireless transceiver for communicating information, rather than spurious energy received from various electronic devices, such as a microwave, monitor, television, and so forth. For example, the radio module 106 may measure a received radio signal strength, received signal strength (RSS) or received signal strength indication (RSSI) from nearby wireless resources (collectively referred to herein as "RSSI"). An RSSI is typically a measurement of the power present in a received radio signal in arbitrary units. The RSSI may provide an indication of how much information may be communicated between devices. Typically a lower RSSI implies lower information rates or quality, while a higher RSSI implies higher information rates or quality.

The scanning operations may include scanning for radio energy of a given RSSI in the appropriate bands or sub-bands of the RF spectrum allocated to the one or more transceivers or radios implemented by the radio module 106. For example, the radio module 106 may scan for various radio signals 120-1-$m$ received from various wireless resources 130-1-$n$. The wireless resources 130-1-$n$ may utilize a radio module implementing the same or similar communication techniques as implemented for the radio module 106. The radio module 106 may perform the scanning operations using a scan list to scan various sets of frequencies. The radio module 106 may perform scanning operations for any number of reasons, such as establishing, managing or terminating a voice communication session or a data communication session, performing hand-off operations when the mobile computing device 110 is moving between wireless resources (e.g., 130-1, 130-2), switching communication channels for the same wireless resource (e.g., 130-1) due to bandwidth or quality issues, and so forth.

It is worthy to note that although the resource detector 107 is shown implemented as part of the radio module 106 in the depicted embodiment, it may be appreciated that the resource detector 107 may be implemented in other parts of the mobile computing device 110, such as the processor 102 and memory 103, for example. The embodiments are not limited in this context.

The location detector 108 may be arranged to detect a location for the mobile computing device 110. The location detector 108 may comprise or be implemented using any particular location detection device or technique, such as an accelerometer, a gyroscope, a global positioning system, a network enhanced global positioning system, a base station proximity system, a triangulation system, a time difference system, a camera, a proximity sensor, and so forth. The location detector 108 may be suitable for use with different map systems, such as a navigation system for a vehicle. The location detector 108 may determine a current position for the mobile computing device 110, and in some cases, a predicted position for the mobile computing device 110 based on velocity and direction information.

The wireless resources 130-1-*n* may comprise any wireless device, fixed or mobile, utilizing a radio module implementing the same or similar communication techniques as implemented for the radio module 106. Examples of wireless resources 130-1-*n* may include without limitation a wireless access point for a WLAN such as an 802.11 or 802.16 system, a base station or node B for a WWAN such as a cellular radiotelephone system, a wireless gateway for an enterprise network, a peer device such as another mobile computing device 110, and so forth. In one embodiment, for example, the wireless resources 130-1-*n* may comprise multiple wireless access points for a WLAN located within a given geographic area, such as an office building.

In general operation, the radio module 106 may receive radio signals from one or more wireless resources 130-1-*n*, such as a wireless access point or base station. In one embodiment, for example, the resource detector 107 may be operative to collect one or more samples for the one or more wireless resources 130-1-*n* based on the received radio signals. The sample may be some measurable characteristic of the one or more wireless resources, such as a RSSI value and/or SNR value derived from the received radio signals of the one or more wireless resources, a number of wireless resources 130-1-*n* derived from the received radio signals, a communication protocol used by one or more wireless resources 130-1-*n*, an application program used by one or more wireless resources 130-1-*n*, a parameter or control directive received from one or more wireless resources 130-1-*n*, and so forth. Other measurable characteristics for the wireless resources 130-1-*n* may be collected as well. The embodiments are not limited in this context.

The network density module 104 may estimate a network density for a given operating environment of the mobile computing device 110 based on the collected samples and a probability density function. The probability density function may be derived, for example, using measured data from geographic locations with known levels of network density, such as a building or campus. The measured data may be used to construct models for different concentrations of network density, such as low density, middle density, high density, and so forth. Any number of groupings or categories may be used for a desired level of granularity. Once the network density module 104 estimates a network density, it may output the estimated network density to the parameter management module 105.

The parameter management module 105 may be operative to manage one or more operational parameters of the mobile computing device 110 based on the estimated network density. Examples of operational parameters may include without limitation a network scanning threshold parameter, a radio-frequency channel parameter, an access point parameter, a rate selection parameter, a frame size parameter, an aggregation size parameter, a packet retry limit parameter, a power level parameter, a component parameter, a protocol parameter, a radio parameter, an application parameter, an alarm parameter, and any other parameters affecting operations for a mobile computing device. The embodiments are not limited in this context.

Figure 2:
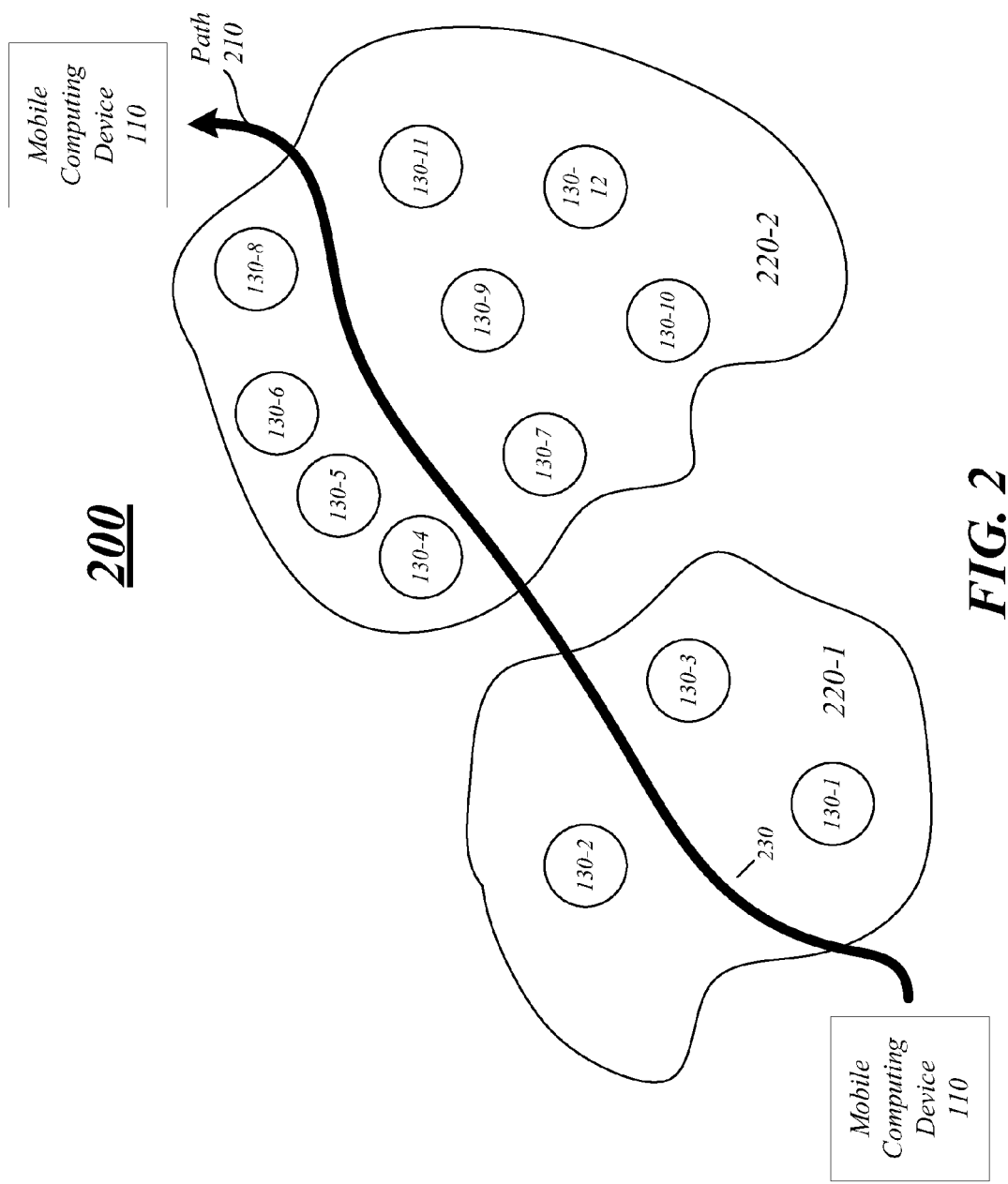
FIG. 2 illustrates one embodiment of an operating environment.

FIG. 2 illustrates one embodiment of an operating environment 200. The operating environment 200 may comprise an exemplary operating environment for the mobile computing device 110, such as a wireless system composed of one or more WLANs or WWANs, suitable for use with some embodiments. The operating environment 200 may comprise multiple geographic regions 220-1-*r* each providing wireless services for a geographic area, such as a building or a campus. Each geographic region 220-1-*r* may be serviced by one or more wireless resources 130-1-*n*. In one embodiment, for example, the wireless resources 130-1-*n* may each comprise wireless access points. Assume the mobile computing device 110 traverses various geographic regions 220-1-*r* of the operating environment 200 as it travels along path 210. As shown in FIG. 2, the mobile computing device 110 may traverse portions of geographic regions 220-1, 220-2 along path 210, and connect to difference wireless access points to create or maintain one or more connections or communication channels with the different WLANs or WWANs.

Assume the location granularity is selected as one of the geographical regions 220-1, 220-2 in the operating environment 200. The resource detector 107 may collect resource information for all wireless resources 130-1-*n* within, or accessible from, a given geographic region. This may include wireless resources for a current geographic region or a neighbor geographic region accessible from a location of the mobile computing device 110. For example, as the mobile computing device 110 enters communication range for geographic region 220-1, the resource detector 107 may begin detecting communications signals from one or more of the wireless resources 130-1, 130-2 and 130-3. Similarly, as the mobile computing device 110 enters communication range for geographic region 220-2, the resource detector 107 may begin detecting communications signals from one or more of the wireless resources 130-4 to 130-12.

As the mobile computing device 110 traverses a particular geographic region along path 210, the radio detector 107 may perform periodic, aperiodic, on-demand or continuous measurements of the wireless RF environment to collect information about each wireless resource 130-1-*n* within each geographic region 220-1-*r*. For example, the resource detector 107 may collect one or more samples for the one or more wireless resources 130-1-*n* based on the received radio signals. The samples may be some measurable characteristic of the one or more wireless resources, such as a RSSI value, a number or count of wireless resources 130-1-*n*, a communication protocol used by one or more wireless resources 130-1-*n*, an application program used by one or more wireless resources 130-1-*n*, a parameter or control directive received from one or more wireless resources 130-1-*n*, and so forth. The resource detector 107 may then output the samples to the network density module 104. The network density module 104 may use the samples to estimate a network density for a given geographic region 220-1-*r* where the mobile computing device 110 is currently (or will be) located.

As shown in FIG. 2, the operating environment 200 has two geographic regions 220-1, 220-2. Each of the geographic regions 220-1, 220-2 contains a certain number of wireless resources 130-1-*n*. For instance, the geographic region 220-1 contains the wireless resources 130-1, 130-2 and 130-3, while the geographic region 220-2 contains the wireless resources 130-4, 130-5, 130-6, 130-7, 130-8, 130-9, 130-10, 130-11 and 130-12. As can be readily discerned, the geographic region 220-1 has a lower number of wireless resources 130-1-*n* than the geographic region 220-2 (e.g., 3 versus 9), and therefore the geographic region 220-1 has a lower network density relative to the geographic region 220-2, which has a higher network density. As such, the operational parameters suitable for the mobile computing device 110 when operating within the geographic region 220-1 may vary considerably from the operational parameters suitable for the mobile computing device 110 when operating within the geographic region 220-2.

The network density module 104 is arranged to estimate a network density for a given geographic region 220-1-$r$ within the operating environment 200 of the mobile computing device 110 based on the samples collected by the resource detector 107 and a probability density function. In probability theory, a probability density function of a continuous random variable is a function that describes the relative likelihood for the random variable to occur at a given point in the observation space. The probability of a random variable falling within a given set is given by the integral of its density over the set. In various embodiments, wireless environments, such as the operating environment 200 illustrated in FIG. 2, may be modeled, for example, through simulation and by actively and passively scanning networks known to be lower and higher density access point deployments. The simulations may include, in some embodiments, placement of access points on a grid and then iterating standard path loss formulas to generate tables of signal strengths per access point at different locations. In some embodiments, this type of scanning may be performed at large companies, metropolitan networks, personal networks, public hotspots or different buildings both indoors and outdoors or any other location where a plurality of access points are known to exist. In some embodiments, histograms of the signal strengths provide a mathematical model of the different density access point deployments. These models may be used to derive a probability density function representative of geographic regions having different levels of network densities, such as low network density, middle network density, high network density, and so forth. It may be appreciated that any number of levels or categories may be defined at different granularities as desired for a given implementation.

The network density module 104 may utilize a given probability density function to estimate a network density for the mobile computing device 110 at a given location. The probability density function may receive as input the samples collected by the resource detector 107, and output a probability value representing an estimated network density for the operating environment 200 of the mobile computing device 110. The estimated network density may comprise a density level falling within a given density category, such as a lower network density category or a higher network density category, with each category representing an approximate amount of wireless resources located within a defined geographic area or region. A probability density function suitable for two states, a lower network density and a higher network density, may be described in more detail with reference to FIGS. 4A-4C.

Once the network density module 104 estimates a network density for a given location or geographic region 220-1-$r$ using a probability density function, the network density module 104 may output the estimated network density to the parameter management module 105. The parameter management module 105 may then modify one or more operational parameters for the mobile computing device 110 based on the estimated network density. Some examples of operational parameters may include without limitation a network scanning threshold parameter, a radio-frequency channel parameter, an access point parameter, a rate selection parameter, a frame size parameter, an aggregation size parameter, a packet retry limit parameter, a power level parameter, a component parameter, a protocol parameter, a radio parameter, an application parameter, an alarm parameter, or any other configurable element of the mobile computing device 110. Which particular operational parameter that is modified for a given implementation may be configurable and defined in a user profile, a device profile, or a network profile associated with a given user, device or network. Additionally or alternatively, a given set of operational parameters for the mobile computing device 110 may be derived using a set of heuristics, algorithms or defined thresholds. The embodiments are not limited in this context.

In one embodiment, for example, the parameter management module 105 may adaptively control access point discovery operations based on an estimated network density. For instance, network discovery may be a time and battery power consuming task. A transceiver, such as a transceiver implemented by the radio module 106, for example, baseband and media access control (MAC) functions may all be involved in the operations of network discovery. In some embodiments, the service of network discovery may involve scanning logic that performs reliable wireless or WLAN scans to perform access point discovery. In various embodiments, theses scans provide an access point address, name and signal strength information to the mobile computing device 110 performing the scan. In some embodiments, it may be desirable to perform the network discovery service in a more power efficient manner to conserve power.

A typical user scenario may involve, for example, a wireless or Wi-Fi service at the mobile computing device 110 to perform an access point discovery scan and display to the user a list of available networks. In some embodiments, the displayed list may be updated frequently so that the graphical user interface (GUI) experience is responsive. In various embodiments, when the mobile computing device 110 connects to a wireless or WLAN network, the service may perform access point discovery so that it can choose the access point that will provide the best connection at that time. In some embodiments, the service may also perform access point discovery as the mobile computing device 110 moves around an extended service set (ESSID) or corporate network with multiple access points. Access point discovery may be performed at other, un-described times as well.

In various embodiments, the parameter management module 105 may set an access point scan rate based on the estimated network density. When the mobile computing device 110 is in an operating environment with a lower network density, such as the geographic region 220-1, this means there are a lower number of potential access points with which the radio module 106 may use to establish and/or maintain a connection. As such, the parameter management module 105 may issue a control directive to reduce a scan rate used by the radio module 106 for the scanning operations. This may reduce power consumption from a power supply for the mobile computing device 110. The scan rate may represent how often the radio module 106 scans for the radio signals 120-1-$m$ within a given time period. For example, the radio module 106 may normally wake up from idle mode to active mode every 1 minute, perform scanning operations for 30 seconds, and revert to idle mode once scanning operations are completed without detecting any radio signals. For operating environments with lower network density, the parameter management module 105 may issue a control directive to reduce a scan rate and/or scan interval for the radio module 106, such as from 30 seconds out of every 1 minute to 30 seconds out of every 2 minutes, for example, since there is lower probability of finding another access point to hand-over a connection. This may decrease power consumption associated with not turning on the transceivers and/or baseband processor, at the potential cost of potential Quality of Service (QoS). Conversely, when the mobile computing device 110 is in an operating environment with a higher network density, such as the geographic region 220-2, this means there are a higher number of potential access points with which the radio module 106 may use to establish and/or maintain a connection. As such, the parameter management module 105 may issue a control directive to increase a scan rate interval (e.g., 30 secs/minute) since there is a higher probability of finding another access point to hand-over a connection. This may potentially increase QoS at the cost of increase power consumption.

In various embodiments, the parameter management module 105 may set a packet retry limit parameter based on the estimated network density. Selecting a packet retry limit parameter suited to a given network density may reduce an amount of power consumed by a mobile computing device. Having a higher packet retry limit in a lower network density environment, for example, could waste valuable communications resources and system power. Modifying a packet retry limit to be efficient at a given level of network density may result in improved system performance and extended battery life.

Since the mobile computing device 110 scans its operational environment to collect samples of wireless resources 130-1-$n$ at a given location or within a geographic region on a dynamic basis, the collected samples and associated operating parameters may be stored by the mobile computing device 110 and/or a remote server 140 as resource information in a resource profile 160-1-$p$ in the resource databases 109, 159. The resource information may then be accessed by the mobile computing device 110 for future use. For instance, as the mobile device 110 traverses a particular geographic region 220-1-$r$ along path 210, the resource detector 107 may perform periodic or continuous measurements of the wireless RF environment to collect resource information for each geographic region 220-1-$r$. For example, the resource detector 107 may collect resource information such as a cell site identifier, a RSSI value, and a RF channel identifier for each cell site, and output the resource information to the parameter management module 105. The parameter management module 105 may receive location information for the mobile computing device 110 from the location detector 108, correlate the location information with a given cell site, and generate a resource profile 160-1-$p$ with the resource information and geographic region. For example, the resource management module 105 may collect resource information while located within the geographic region 220-1, receive location information indicating that the mobile computing device 110 is actually located within the geographic region 220-1, and create a resource profile 160-1 with the resource information collected within the cell site 220-1 and the actual (e.g., precise GPS coordinates) or approximate location (e.g., cell site coordinates) of the mobile computing device 110 when collecting the resource information. The parameter management module 105 may store the resource profile 160-1 in the local resource database 109 or the remote resource database 159, as optionally indexed by the geographic region 220-1 to facilitate search operations on the resource databases 109, 159. The resource profiles 160-1-$p$ may be used for future use when the mobile computing device 110 is in the same approximate location, for other mobile computing devices when in the same approximate location, or historical analysis to assist in optimizing or tuning various operational parameters for the mobile computing device 110.

In one embodiment, the location detector 108 may be operative to determine a location for the mobile computing device as a current location based on location information for the mobile computing device 110. In this case, the location detector 108 simply calculates and outputs a current location for the mobile computing device 110. The parameter management module 105 may operate in a reactive mode and create and/or retrieve a resource profile 160-1-$p$ associated with the current location.

In one embodiment, the location detector 108 may be operative to determine a location for the mobile computing device 110 as a predicted location based on velocity information and direction information for the mobile computing device 110. Velocity is a vector quantity with dimensions of speed and direction. Velocity is defined as the rate of change of position. It is a vector physical quantity, and therefore both speed and direction are required to define it. Speed is a scalar quantity with dimensions of distance and time. Speed is the rate of motion, or equivalently the rate of change in position, many times expressed as distance d traveled per unit of time t. By calculating a velocity for the mobile computing device 110 using speed and direction for the mobile computing device, or a relative velocity as compared to a fixed location (e.g., a wireless resource 130-1-$n$), the location detector 108 may implement a more complex algorithm to calculate and output one or more predicted locations for the mobile computing device 110. This may be accomplished, for example, in conjunction with various electronic maps and/or navigation techniques. In this manner, the parameter management module 105 may operate in a proactive mode and create and/or retrieve a resource profile 160-1-$p$ associated with the predicted locations. As a result, the parameter management module 105 may have additional time to control the radio module 106, or other portions of the mobile computing device 110, thereby enhancing the ability of the radio module 106 to acquire an active communications channel. The mobile device may optionally store any estimates of network density and location for future use when the mobile device returns to the same location, Operations for the above embodiments may be further described with reference to the following figures and accompanying examples. Some of the figures may include a logic diagram. Although such figures presented herein may include a particular logic diagram, it can be appreciated that the logic diagram merely provides an example of how the general functionality as described herein can be implemented. Further, the given logic diagram does not necessarily have to be executed in the order presented, unless otherwise indicated. In addition, the given logic diagram may be implemented by a hardware element (e.g., a logic device), a software element executed by a processor, or any combination thereof. The embodiments are not limited in this context.

Figure 3:
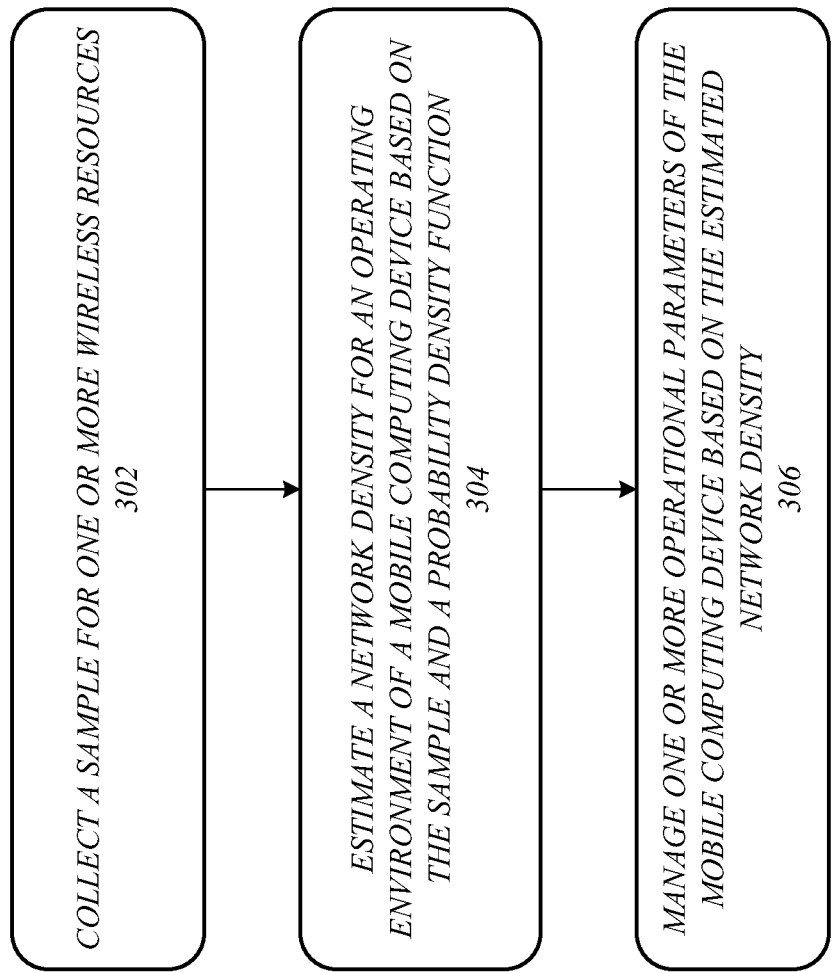
FIG. 3 illustrates one embodiment of a logic diagram.

FIG. 3 illustrates a logic diagram. In particular, FIG. 3 illustrates a logic diagram 300, which may be representative of the operations executed by one or more embodiments described herein.

As shown in the FIG. 3, the logic diagram 300 collects a sample for one or more wireless resources at block 302. For example, as the mobile computing device 110 moves along the path 210 for the operating environment 200, the mobile computing device 110 may traverse the geographic regions 220-1, 220-2. The resource detector 107 for the radio module 106 collects various samples for one or more wireless resources 130-1-$n$, such as an RSSI value for one or more of the wireless resources 130-1, 130-2 and/or 130-3, for example.

The logic diagram 300 estimates a network density for an operating environment of a mobile computing device based on the sample and a probability density function at block 304. For example, the network density module 104 estimates a network density for the operating environment 200 of the mobile computing device 110 based on the current sample and a probability density function. The probability density function may take as input the collected sample, and outputs a probability of whether the mobile computing device 110 is currently located within a geographic region 220-1-r having a lower network density or a higher network density. Additionally or alternatively, the probability density function may take as input the current sample and a previous sample or a subsequent sample, and outputs a probability of whether the mobile computing device 110 is currently located within a geographic region 220-1-r having a lower network density or a higher network density. This alternative may be implemented when using feedback information from Bayesian estimation, for example. A determination of a given network density may be based on the probability value, such as comparing the probability value to a threshold value, for example.

The logic diagram 300 manages one or more operational parameters of the mobile computing device based on the estimated network density at block 306. For example, the parameter management module 105 adaptively controls one or more operational parameters of the mobile computing device 110 based on the estimated network density. The parameter management module 105 may send control directives to various hardware and/or software components of the mobile computing device 110 to change a behavior or operation for the corresponding component. For instance, the parameter management module 105 may change a power level or mode for a power supply, a scan rate interval or RSSI trigger for the radio module 106, a brightness level for a touchscreen display for the mobile computing device 110 (e.g., reducing brightness level to divert more power to the radio module 106), to name just a few.

As previously described, the network density module 104 may use one or more samples and a given probability density function to estimate a network density. The samples may comprise any measurable characteristic of the one or more wireless resources 130-1-n. For instance, the samples may comprise a power level for a received radio signal, such as a RSSI or signal-to-noise ratio (SNR) derived from the received radio signals from the one or more wireless resources 130-1-n.

In some embodiments, the mobile computing device 110 may be moved around an extended service set identifier (ESSID) or corporate network containing multiple access points. When moved, the mobile computing device 110 may be required to choose a new or different access point to maintain a network connection. In various embodiments, a service of the mobile computing device 110 may program the wireless or WLAN communications processor with various RSSI triggers to assist in this process and to conserve power.

Choosing the correct RSSI triggers may be accomplished with the creation of models of the wireless or WLAN environment based on different topologies and densities of access points over different areas in various embodiments. For example, the wireless or WLAN environment models may be comprised of discrete states including low and high density access point deployments. Additional states may also exist.

Figure 4A:
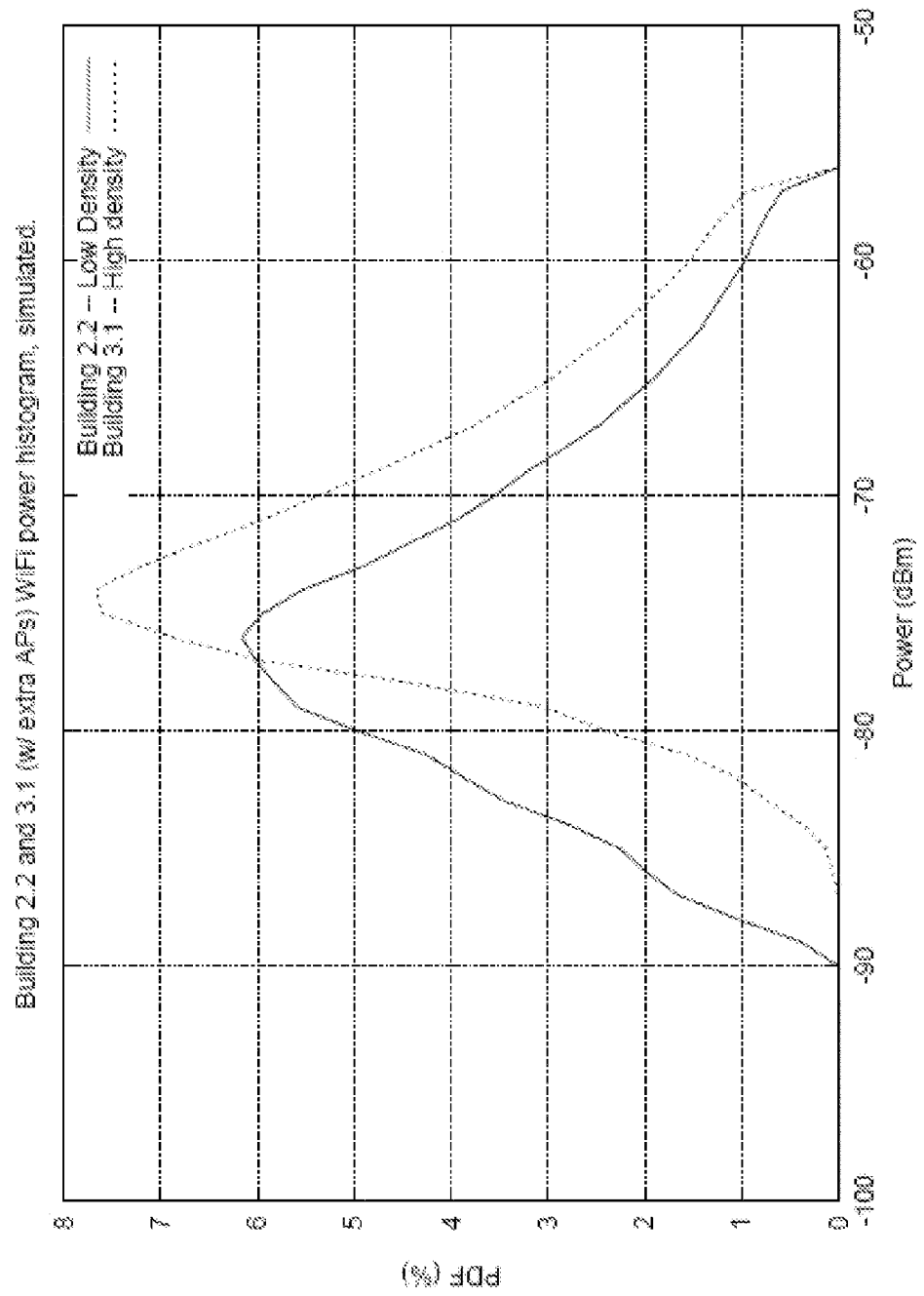
FIG. 4A illustrates one embodiment of a power histogram.

FIG. 4A may illustrate simulated power histograms for two buildings having different topologies and densities of access points in different areas. More particularly, FIG. 4A illustrates a WiFi power histogram showing power versus probably density function for a Building 2.2 and a Building 3.1. As illustrated, Building 2.2 may comprise low density and Building 3.1 may comprise high density. Other embodiments are described and claimed.

In various embodiments, wireless environments, such as the environment illustrated in FIG. 4A, may be modeled, for example, through simulation and by actively and passively scanning networks known to be low and high density access point deployments. The simulations may include, in some embodiments, placement of access points on a grid and then iterating standard path loss formulas to generate tables of signal strengths per access point at different locations. In some embodiments, this type of scanning may be performed at large companies, metropolitan networks, personal networks, public hotspots or different buildings both indoors and outdoors or any other location where a plurality of access points are known to exist. In some embodiments, histograms of the signal strengths provide a mathematical model of the different density access point deployments.

Figure 4B:
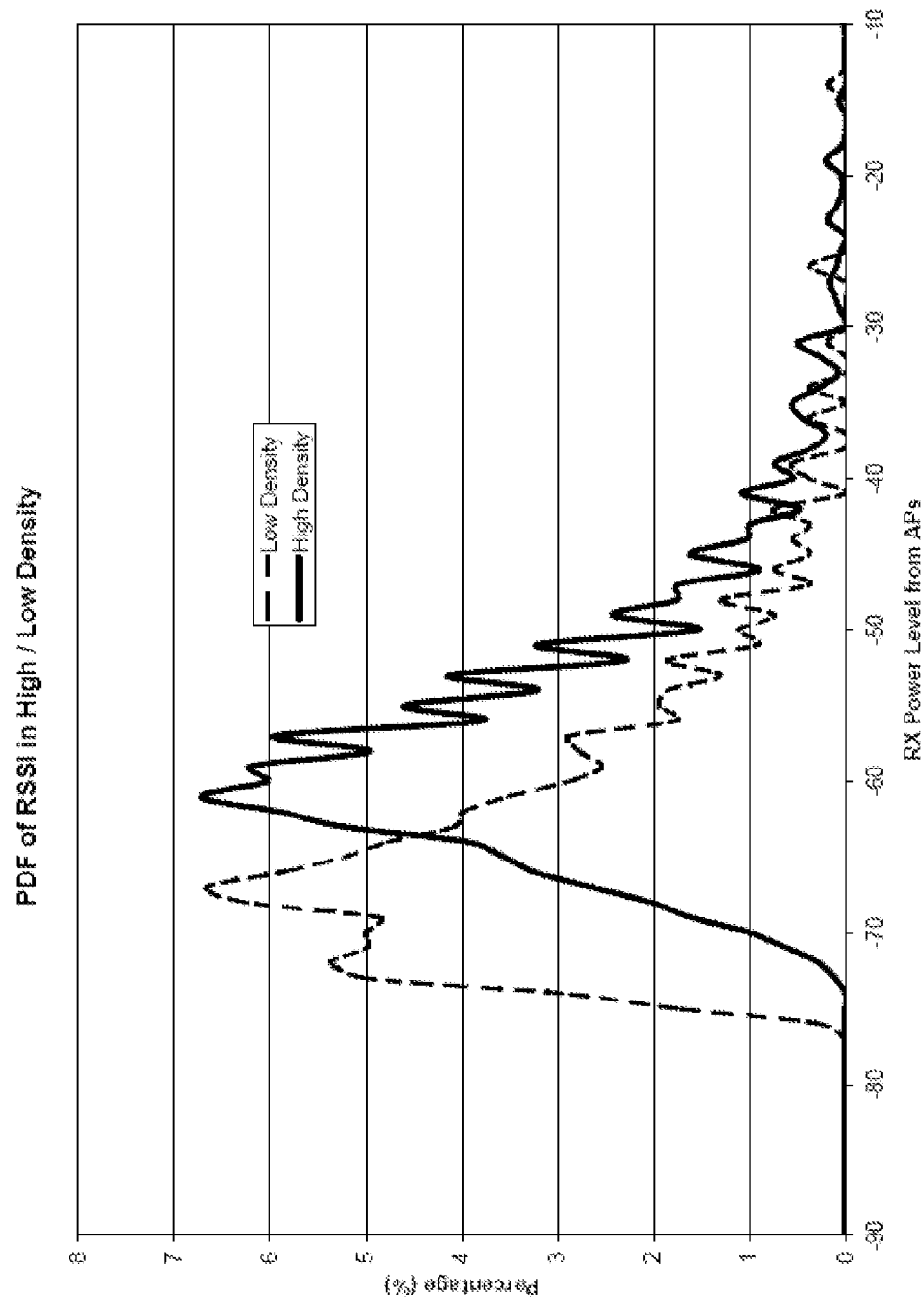
FIG. 4B illustrates one embodiment of a power density factor graph.

FIG. 4B illustrates a graph showing probably density function of RSSI in high and low density. The horizontal axis of the graph shows a received power level from an access point and the vertical access illustrates a percentage. Other embodiments are described and claimed.

In various embodiments, probability density functions for different access point density models may be developed. These models may be used, for example, by designers or a service of a mobile computing device to select appropriate RSSI triggers that match the density of the access point deployments. Bayesian inference may be used to train the model to the actual wireless or WLAN environments the mobile computing device is used in, in some embodiments. By providing appropriate RSSI triggers which invoke scanning operations by the wireless or WLAN radio in the most efficient places of a WLAN environment, power savings may be achieved in various embodiments.

Figure 4C:
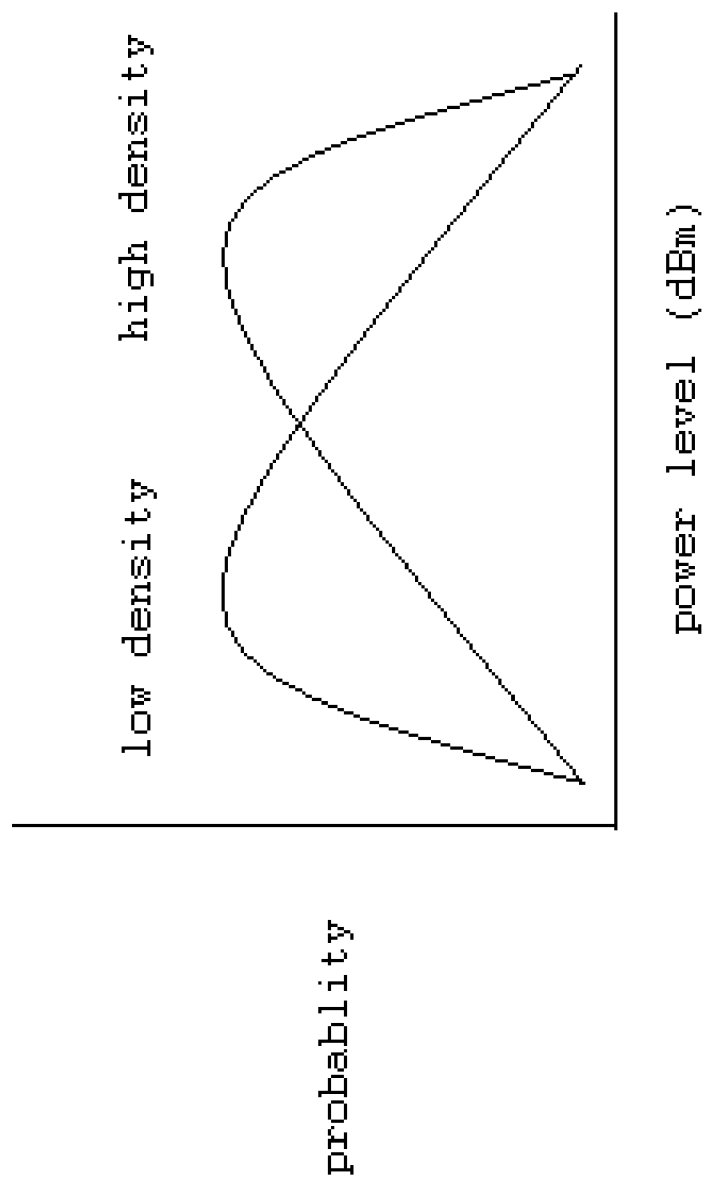
FIG. 4C illustrates one embodiment of a probability graph.

FIG. 4C illustrates a sample graph showing power level versus probably for high and low density areas. A graph similar to that shown in FIG. 4C may be used, as described above, to select appropriate RSSI triggers to allow a mobile computing device to invoke scanning operations, for example, only in the most efficient places of a wireless environment, as illustrated by the peaks of the low and high density curves. Invoking scanning operations only in the most efficient places of a wireless environment may result in power conservation for a mobile computing device because computing power may not be wasted in areas of low access point availability. Other embodiments are described and claimed.

In some embodiments, when a mobile computing device scans for an access point, a list of received signal power levels may be compared to the probability density functions or WLAN environment models. In various embodiments, a Bayesian inference may be used to select the appropriate RSSI triggers by identifying the density of the access point deployment.

The network density module 104 may be arranged to generate or update an estimated network density according to one or more collected samples using a Bayesian inference algorithm. Initially, in some embodiments, the probability of being in either topology may be 0.5 but as each RSSI sample is received, the probability may be adjusted according to the formula shown in Equation (1) as follows:

$$P(H_{high} \mid S) = \frac{P(S \mid H_{high})P(H_{high})}{P(S \mid H_{high})P(H_{high}) + P(S \mid H_{low})P(H_{low})} \quad \text{Equation (1)}$$

where H-high is the high density network hypothesis, H-low is the low density hypotheses and S is the sample RSSI measurement from an access point that is received.

In various embodiments, the resulting value may be used as the P(H high) for the next sample. In this way, the model may adapt as needed and may statically discount samples that do not provide a clear distinction between the two hypotheses. In various embodiments, more than two hypotheses are possible but only two hypotheses are shown for purposes of illustration and not limitation. Other embodiments are described and claimed.

In various embodiments, the above described Bayesian model and inference can help to identify other quality of service parameters. For example, a rate selection algorithm, a frame size, an aggregation size, a packet retry limit, a scan rate, a power level, a radio selection, and other operational parameters can be adjusted to fit the access point deployment density. In various embodiments, adjustments of one or more of these parameters may result in more efficient transmission of frames and additional power savings.

In addition to RSSI measurements, the network density module 104 may use other measurable characteristics associated with the wireless resources 130-1-$n$ as relevant samples to estimate network density as well. For instance, a sample may comprise a number of one or more wireless resources 130-1-$n$ derived from the received radio signals of the one or more wireless resources 130-1-$n$. As the mobile computing device 110 traverses along the path 210 across the geographic regions 220-1, 220-2, the resource detector 107 may collect samples from the respective geographic region 220-1, 220-2 in which it is located. For example, when the mobile computing device 110 is located within the geographic region 220-1, the resource detector 107 may receive radio signals from the wireless resources 130-1, 130-2 and/or 130-3. The received radio signals may include an access point identifier for each of the wireless resources 130-1, 130-2 and/or 130-3. The network density module 104 may ascertain a number of wireless resources 130-1-$n$ within a given geographic region 220-1-$r$ using the different access point identifiers, which in the case of the geographic region 220-1 would be three (3). This value could be used as input to a probability density function designed to provide a probability of network density based on a number of access points within communication range of the radio module 106. A lower number of access points within communication range of a single device may imply a lower network density, while a higher number of access points within communication range of a single device may imply a higher network density. Other samples may include a signal quality parameter such as a SNR level, a given communications protocol used by a wireless resource 130-1-$n$, an application used by a wireless resource 130-1-$n$, a control directive or parameter received from a wireless resource 130-1-$n$, and so forth. The embodiments are not limited in this context.

Figure 5:
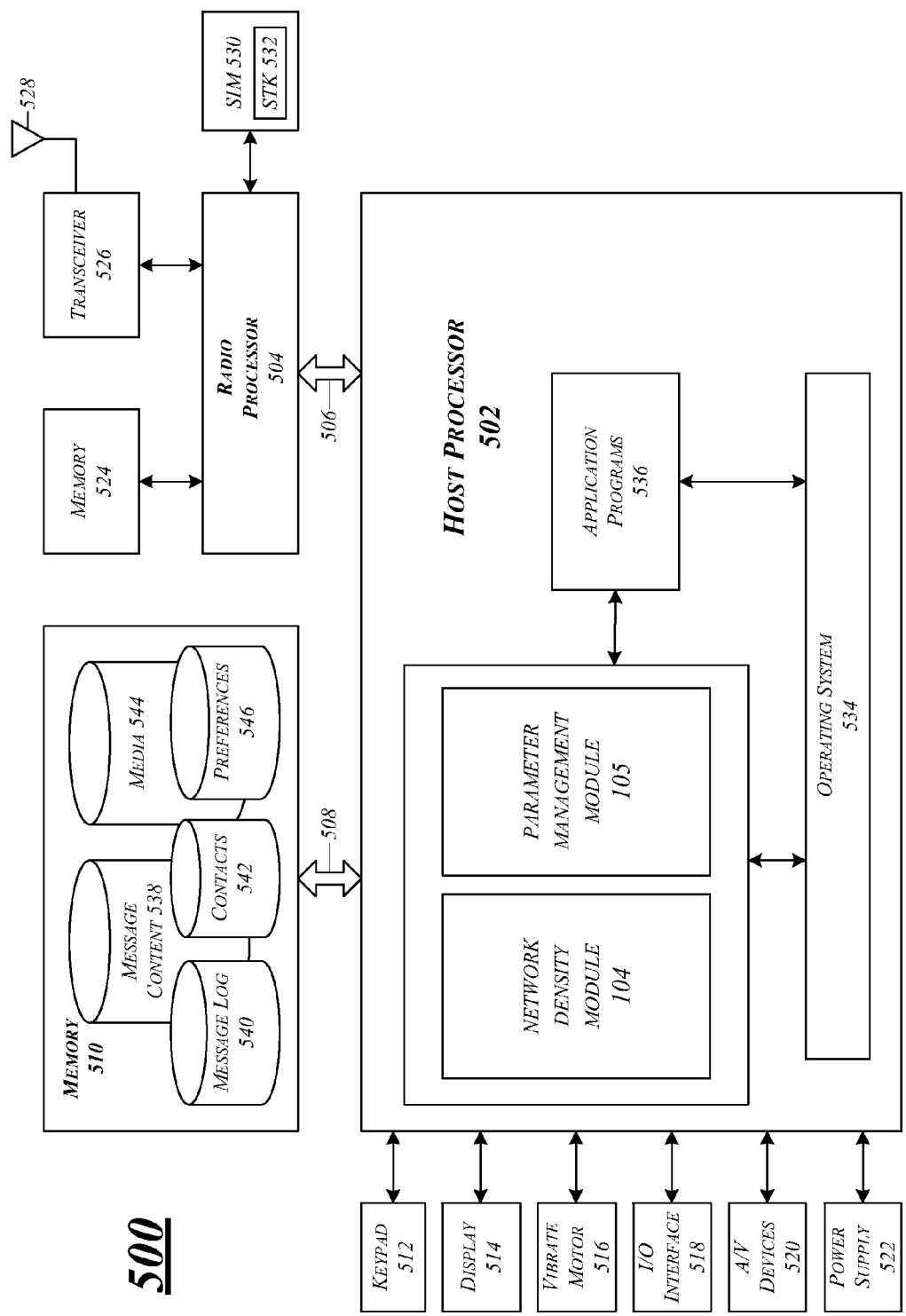
FIG. 5 illustrates one embodiment of a second mobile computing device.

FIG. 5 illustrates a block diagram of a second mobile computing device 500 suitable for implementing various embodiments, including the mobile computing device 100. It may be appreciated that the mobile computing device 500 is only one example of a suitable mobile computing environment and is not intended to suggest any limitation as to the scope of use or functionality of the embodiments. Neither should the mobile computing device 500 be interpreted as having any dependency or requirement relating to any one or combination of components illustrated in the exemplary mobile computing device 500.

The host processor 502 (e.g., similar to the processor 110) may be responsible for executing various software programs such as system programs and applications programs to provide computing and processing operations for the mobile computing device 500. The radio processor 504 may be responsible for performing various voice and data communications operations for the mobile computing device 500 such as transmitting and receiving voice and data information over one or more wireless communications channels. Although the mobile computing device 500 is shown with a dual-processor architecture, it may be appreciated that the mobile computing device 500 may use any suitable processor architecture and/or any suitable number of processors or number of processor cores in accordance with the described embodiments. In one embodiment, for example, the processors 502, 504 may be implemented using a single integrated processor.

The host processor 502 may be implemented as a host central processing unit (CPU) using any suitable processor or logic device, such as a as a general purpose processor. The host processor 502 may also be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 502 may be coupled through a memory bus 508 to a memory 510. The memory bus 508 may comprise any suitable interface and/or bus architecture for allowing the host processor 502 to access the memory 510. Although the memory 510 may be shown as being separate from the host processor 502 for purposes of illustration, it is worthy to note that in various embodiments some portion or the entire memory 510 may be included on the same integrated circuit as the host processor 502. Alternatively, some portion or the entire memory 510 may be disposed on an integrated circuit or other medium (e.g., hard disk drive) external to the integrated circuit of the host processor 502. In various embodiments, the mobile computing device 500 may comprise an expansion slot to support a multimedia and/or memory card, for example.

The memory 510 may be implemented using any computer-readable media capable of storing data such as volatile or non-volatile memory, removable or non-removable memory, erasable or non-erasable memory, writeable or re-writeable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The mobile computing device 500 may comprise an alphanumeric keypad 512 coupled to the host processor 502. The keypad 512 may comprise, for example, a QWERTY key layout and an integrated number dial pad. The mobile computing device 500 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth. The keypad 512 may comprise a physical keypad using hard buttons, or a virtual keypad using soft buttons displayed on a display 514. The keypad may also comprise a thumbboard.

The mobile computing device 500 may comprise a display 514 coupled to the host processor 502. The display 514 may comprise any suitable visual interface for displaying content to a user of the mobile computing device 500. In one embodiment, for example, the display 514 may be implemented by a liquid crystal display (LCD) such as a touch-sensitive color (e.g., 56-bit color) thin-film transistor (TFT) LCD screen. The touch-sensitive LCD may be used with a stylus and/or a handwriting recognizer program.

The mobile computing device 500 may comprise a vibrating motor 516 coupled to the host processor 502. The vibrating motor 516 may be enable or disabled according to the preferences of the user of the mobile computing device 500. When enabled, the vibrating motor 516 may cause the mobile computing device 500 to move or shake in a generic and/or patterned fashion in response to a triggering event such as the receipt of a telephone call, text message, an alarm condition, a game condition, and so forth. Vibration may occur for a fixed duration and/or periodically according to a pulse.

The mobile computing device 500 may comprise an input/output (I/O) interface 518 coupled to the host processor 502. The I/O interface 518 may comprise one or more I/O devices such as a serial connection port, SDIO bus, PCI, USB, an infrared port, integrated Bluetooth wireless capability, global position system (GPS) capability, and/or integrated 802.11x (e.g. 802.11b, 802.11g, 802.11a, 802.11n, etc.) (WiFi) wireless capability, to enable wired (e.g., USB cable) and/or wireless connection to a local computer system, such as a local personal computer (PC). In various implementations, mobile computing device 500 may be arranged to synchronize information with a local computer system.

The host processor 502 may be coupled to various audio/video (A/V) devices 520 that support A/V capability of the mobile computing device 500. Examples of A/V devices 520 may include, for example, a microphone, one or more speakers (such as speaker system 108), an audio port to connect an audio headset, an audio coder/decoder (codec), an audio player, a Musical Instrument Digital Interface (MIDI) device, a digital camera, a video camera, a video codec, a video player, and so forth.

The host processor 502 may be coupled to a power supply 522 arranged to supply and manage power to the elements of the mobile computing device 500. In various embodiments, the power supply 522 may be implemented by a rechargeable battery, such as a removable and rechargeable lithium ion battery to provide direct current (DC) power, and/or an alternating current (AC) adapter to draw power from a standard AC main power supply.

The radio processor 504 may be arranged to communicate voice information and/or data information over one or more assigned frequency bands of a wireless communication channel. The radio processor 504 may be implemented as a communications processor using any suitable processor or logic device, such as a modem processor or baseband processor. The radio processor 504 may also be implemented as a digital signal processor (DSP), media access control (MAC) processor, or any other type of communications processor in accordance with the described embodiments. The radio processor 504 may perform analog and/or digital baseband operations for the mobile computing device 500. For example, the radio processor 504 may perform digital-to-analog conversion (DAC), analog-to-digital conversion (ADC), modulation, demodulation, encoding, decoding, encryption, decryption, and so forth.

The mobile computing device 500 may comprise a memory 524 coupled to the radio processor 504. The memory 524 may be implemented using any of the computer-readable media described with reference to the memory 510. The memory 524 may be typically implemented as flash memory and synchronous dynamic random access memory (SDRAM). Although the memory 524 may be shown as being separate from the radio processor 504, some or all of the memory 524 may be included on the same IC as the radio processor 504.

The mobile computing device 500 may comprise a transceiver module 526 coupled to the radio processor 504. The transceiver module 526 may comprise one or more transceivers, such as wireless transceivers 108 of mobile computing device 100, arranged to communicate using different types of protocols, communication ranges, operating power requirements, RF sub-bands, information types (e.g., voice or data), use scenarios, applications, and so forth. In various embodiments, the transceiver module 526 may comprise one or more transceivers arranged to support voice communications and/or data communications for the wireless network systems or protocols as previously described. In some embodiments, the transceiver module 526 may further comprise a Global Positioning System (GPS) transceiver to support position determination and/or location-based services.

The transceiver module 526 generally may be implemented using one or more chips as desired for a given implementation. Although the transceiver module 526 may be shown as being separate from and external to the radio processor 504 for purposes of illustration, it is worthy to note that in various embodiments some portion or the entire transceiver module 526 may be included on the same integrated circuit as the radio processor 504. The embodiments are not limited in this context.

The mobile computing device 500 may comprise an antenna system 528 for transmitting and/or receiving electrical signals. As shown, the antenna system 528 may be coupled to the radio processor 504 through the transceiver module 526. The antenna system 528 may comprise or be implemented as one or more internal antennas and/or external antennas, such as antenna 112 of mobile computing device 100.

The mobile computing device 500 may comprise a subscriber identity module (SIM) 530 coupled to the radio processor 504. The SIM 530 may comprise, for example, a removable or non-removable smart card arranged to encrypt voice and data transmissions and to store user-specific data for allowing a voice or data communications network to identify and authenticate the user. The SIM 530 also may store data such as personal settings specific to the user. In some embodiments, the SIM 530 may be implemented as an UMTS universal SIM (USIM) card or a CDMA removable user identity module (RUIM) card. The SIM 530 may comprise a SIM application toolkit (STK) 532 comprising a set of programmed commands for enabling the SIM 530 to perform various functions. In some cases, the STK 532 may be arranged to enable the SIM 530 to independently control various aspects of the mobile computing device 500.

As mentioned above, the host processor 502 may be arranged to provide processing or computing resources to the mobile computing device 500. For example, the host processor 502 may be responsible for executing various software programs including system programs such as operating system (OS) 534 and application programs 536. System programs generally may assist in the running of the mobile computing device 500 and may be directly responsible for controlling, integrating, and managing the individual hardware components of the computer system. The OS 534 may be implemented, for example, as a Palm WebOS®, Palm OS®, Palm OS® Cobalt, Microsoft® Windows OS, Microsoft Windows® CE OS, Microsoft Pocket PC OS, Microsoft Mobile OS, Symbian OS™, Embedix OS, Linux OS, Binary Run-time Environment for Wireless (BREW) OS, JavaOS, a Wireless Application Protocol (WAP) OS, or other suitable OS in accordance with the described embodiments. The mobile computing device 500 may comprise other system programs such as device drivers, programming tools, utility programs, software libraries, application programming interfaces (APIs), and so forth.

Application programs 536 generally may allow a user to accomplish one or more specific tasks. In various implementations, the application programs 536 may provide one or more graphical user interfaces (GUIs) to communicate information between the mobile computing device 500 and a user. In some embodiments, application programs 536 may comprise upper layer programs running on top of the OS 535 of the host processor 502 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

Examples of application programs 536 may include, without limitation, messaging applications, web browsing applications, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. Messaging applications may be arranged to communicate various types of messages in a variety of formats. Examples of messaging applications may include without limitation a cellular telephone application, a Voice over Internet Protocol (VoIP) application, a Push-to-Talk (PTT) application, a voicemail application, a facsimile application, a video teleconferencing application, an IM application, an e-mail application, an SMS application, an MMS application, and so forth. It is also to be appreciated that the mobile computing device 500 may implement other types of applications in accordance with the described embodiments.

The host processor 502 may include the network density module 104 and the parameter management module 105 in some embodiments, as described with reference to FIG. 1, for example.

The mobile computing device 500 may include various databases implemented in the memory 510. For example, the mobile computing device 500 may include a message content database 538, a message log database 540, a contacts database 542, a media database 544, a preferences database 546, and so forth. The message content database 538 may be arranged to store content and attachments (e.g., media objects) for various types of messages sent and received by one or more messaging applications. The message log 540 may be arranged to track various types of messages which are sent and received by one or more messaging applications. The contacts database 542 may be arranged to store contact records for individuals or entities specified by the user of the mobile computing device 500. The media database 544 may be arranged to store various types of media content such as image information, audio information, video information, and/or other data. The preferences database 546 may be arranged to store various settings such as rules and parameters for controlling the operation of the mobile computing device 500.

In some cases, various embodiments may be implemented as an article of manufacture. The article of manufacture may include a computer readable storage medium arranged to store logic, instructions and/or data for performing various operations of one or more embodiments. Examples of storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A mobile computing device, comprising:
   a radio module operative to receive radio signals;
   a resource detector operative to collect resource information for one or more wireless resources within or accessible from a geographic region based on the received radio signals, the resource information comprising a measured value of a characteristic of the one or more wireless resources, wherein the geographic region is determined based on a location of the mobile computing device, the location of the mobile computing device determined when collecting the resource information;
   a network density module operative to estimate a network density of the geographic region for an operating environment of the mobile computing device based on the measured value of the characteristic of the one or more wireless resources and a probability density function; and
   a parameter management module operative to adaptively set a value for one or more operational parameters of the mobile computing device based on the estimated network density of the geographic region.

2. The mobile computing device of claim 1, the probability density function to receive as input the measured value of the characteristic of the one or more wireless resources, and output a probability value representing an estimated network density for the operating environment of the mobile computing device.

3. The mobile computing device of claim 1, the characteristic of the one or more wireless resources comprising a received signal strength indication derived from the received radio signals of the one or more wireless resources.

4. The mobile computing device of claim 1, the characteristic of the one or more wireless resources comprising a number of the one or more wireless resources derived from the received radio signals of the one or more wireless resources.

5. The mobile computing device of claim 1, wherein the location of the mobile computing device within the geographic region indicates a current location of the mobile device.

6. The mobile computing device of claim 1, wherein the location of the mobile computing device within the geographic region indicates a predicted location of the mobile device.

7. The mobile computing device of claim 1, wherein the resource information for the one or more wireless resources is correlated with the location of the mobile computing device to generate a resource profile of the geographic region, and further comprising storing the resource profile in a resource database.

8. The mobile computing device of claim 1, wherein the parameter management module is further operative to set an access point scan rate based on the estimated network density.

9. The mobile computing device of claim 1, wherein the parameter management module is further operative to set a packet retry limit based on the estimated network density.

10. A method, comprising:
    collecting, by a mobile computing device, resource information for one or more wireless resources within or accessible from a geographic region, the resource information comprising a measured value of a characteristic of the one or more wireless resources, wherein the geographic region is determined based on a location of the mobile computing device, the location of the mobile computing device determined when collecting the resource information;
    estimating by the mobile computing device, a network density of the geographic region for an operating environment of the mobile computing device based on the measured value of the characteristic of the one or more wireless resources and a probability density function; and
    adaptively setting, by the mobile computing device, a value for one or more operational parameters of the mobile computing device based on the estimated network density of the geographic region.

11. The method of claim 10, comprising updating the estimated network density according to previously collected resource information or subsequently collected resource information relative to the currently collected resource information using a Bayesian inference algorithm.

12. The method of claim 10, wherein the location of the mobile computing device within the geographic region indicates a current location of the mobile device.

13. The method of claim 10, wherein the location of the mobile computing device within the geographic region indicates a predicted location of the mobile device.

14. The method of claim 10, further comprising correlating the resource information for the one or more wireless resources with the location of the mobile computing device to generate a resource profile; and storing the resource profile in a resource database.

15. The method of claim 10, wherein the adaptively setting comprises setting an access point scan rate based on the estimated network density.

16. The method of claim 10, wherein the adaptively setting comprises setting a packet retry limit based on the estimated network density.

17. An article of manufacture comprising a non-transitory computer-readable storage medium containing instructions that when executed by a processor enable a system to:
    collect, by a mobile computing device, resource information for one or more wireless resources within or accessible from a geographic region, the resource information comprising a measured value of a characteristic of the one or more wireless resources, wherein the geographic region is determined based on a location of the mobile computing device, the location of the mobile computing device determined when collecting the resource information;
    estimate a network density of the geographic region for an operating environment of the mobile computing device based on the measured value of the characteristic of the one or more wireless resources and a probability density function; and adaptively set a value for one or more operational parameters of the mobile computing device based on the estimated network density of the geographic region.

18. The article of manufacture of claim 17, wherein the resource information for the one or more wireless resources is correlated with the location of the mobile computing device to generate a resource profile, and further comprising instructions that when executed by the processor enable the system to store the resource profile in a resource database.

19. The article of manufacture of claim 17, wherein the instructions that when executed by the processor enable the system to set include instructions that when executed by the processor enable the system to set an access point scan rate based on the estimated network density.

20. The article of manufacture of claim 17, wherein the instructions that when executed by the processor enable the system to set include instructions that when executed by the processor enable the system to set a packet retry limit based on the estimated network density.

\* \* \* \* \*